United States Patent
Birsen et al.

(10) Patent No.: US 10,266,193 B2
(45) Date of Patent: Apr. 23, 2019

(54) TRANSPORT MEANS

(71) Applicant: AYGAZ ANONIM SIRKETI, Istanbul (TR)

(72) Inventors: Emrah Birsen, Izmit/Kocaeli (TR); Can Tikiroglu, Zincirlikuyu Istanbul (TR); Ali Kemal Eker, Yarimca Korfez/Kocaeli (TR); Atakan Gurleyen, Sariyer/Istanbul (TR)

(73) Assignee: AYGAZ ANONIM SIRKETI, Istanbul (TR)

( * ) Notice: Subject to any disclaimer, the term of this patent is extended or adjusted under 35 U.S.C. 154(b) by 0 days.

(21) Appl. No.: 15/760,696

(22) PCT Filed: Dec. 21, 2016

(86) PCT No.: PCT/TR2016/050520
§ 371 (c)(1),
(2) Date: Mar. 16, 2018

(87) PCT Pub. No.: WO2017/111754
PCT Pub. Date: Jun. 29, 2017

(65) Prior Publication Data
US 2018/0257687 A1  Sep. 13, 2018

(30) Foreign Application Priority Data

Dec. 22, 2015  (TR) .................................. 2015/16610

(51) Int. Cl.
*B62B 1/06* (2006.01)
*B62B 1/14* (2006.01)
(Continued)

(52) U.S. Cl.
CPC .............. *B62B 1/264* (2013.01); *B62B 1/002* (2013.01); *B62B 1/125* (2013.01); *B62B 1/14* (2013.01);
(Continued)

(58) Field of Classification Search
CPC .. B62B 1/06; B62B 1/14; B62B 1/264; B62B 3/104
See application file for complete search history.

(56) References Cited

U.S. PATENT DOCUMENTS

| 2,930,561 | A | * | 3/1960 | Bittle | ...................... B62B 1/264 |
| | | | | | 211/85.19 |
| 5,224,678 | A | * | 7/1993 | McClellan | ......... B65D 21/0224 |
| | | | | | 108/53.1 |
| 2014/0145408 | A1 | * | 5/2014 | Midas | ...................... B62B 3/02 |
| | | | | | 280/47.131 |

FOREIGN PATENT DOCUMENTS

| AT | 207 695 B | 2/1960 |
| CN | 201999017 U | 10/2011 |

(Continued)

OTHER PUBLICATIONS

International Search Report and Written Opinion for PCT/TR2016/050520 filed on Dec. 12, 2016.

(Continued)

*Primary Examiner* — Bryan A Evans
(74) *Attorney, Agent, or Firm* — Notaro, Michalos & Zaccaria P.C.

(57) ABSTRACT

A transport means (N) includes at least one lower support (1) on which at least two cylinders, in which a material which can be a compressed gas is stored, are placed by being stacked on the top of one another; at least one body (3) having one end connected to said lower support (1); at least one first steering element (2a) disposed on the body (3) for steering the cylinders during transport, at least two motion elements (4) connected to said body (3) for providing the movement of the transport means (N), the transport means (N) including at least one thrust mechanism which allows the topmost cylinder to move closer toward the lower (Continued)

support (1) such that the cylinders stacked on the top of one another do not come apart during transport.

20 Claims, 3 Drawing Sheets

(51) Int. Cl.
    *B62B 1/26*     (2006.01)
    *B62B 1/00*     (2006.01)
    *B62B 3/00*     (2006.01)
    *B62B 3/10*     (2006.01)
    *F17C 13/08*     (2006.01)
    *B62B 1/12*     (2006.01)
    *B62B 3/02*     (2006.01)
    *B62B 5/06*     (2006.01)

(52) U.S. Cl.
    CPC ............... *B62B 3/006* (2013.01); *B62B 3/02* (2013.01); *B62B 3/104* (2013.01); *B62B 5/06* (2013.01); *F17C 13/084* (2013.01); *F17C 13/085* (2013.01); *B62B 2202/022* (2013.01); *B62B 2203/21* (2013.01); *B62B 2203/24* (2013.01); *B62B 2206/06* (2013.01); *B62B 2301/08* (2013.01); *F17C 2205/013* (2013.01); *F17C 2205/0161* (2013.01); *F17C 2205/0169* (2013.01); *F17C 2205/0192* (2013.01); *F17C 2221/033* (2013.01); *F17C 2221/035* (2013.01); *F17C 2223/0123* (2013.01); *F17C 2223/0153* (2013.01); *F17C 2223/033* (2013.01); *F17C 2223/035* (2013.01); *F17C 2270/07* (2013.01); *F17C 2270/0745* (2013.01)

(56) References Cited

FOREIGN PATENT DOCUMENTS

| DE | 199 33 801 A1 | 12/1999 |
|----|---------------|---------|
| FR | 1 531 622 A | 7/1968 |
| FR | 2 643 600 A1 | 8/1990 |

OTHER PUBLICATIONS

International Preliminary Report on Patentability for PCT/TR2016/050520 filed on Dec. 12, 2016.

* cited by examiner

TRANSPORT MEANS

FIELD OF INVENTION

The present invention relates to a means for transporting a multitude of cylinders, in which compressed gases are stored.

PRIOR ART

Nowadays, cylinders are used for storing fuels such as natural gas, LPG etc. under pressure. Such cylinders, typically in cylindrical form, are made of steel-like materials to provide a safe way of storing the high-pressure gases therein. However, the use of steel-like heavyweight metals in the manufacture of such cylinders makes it difficult for a person to transport the cylinders from one place to another. Therefore, means such as hand trucks are used to carry heavy objects like gas cylinders.

One example of hand trucks, or carts, for transporting liquefied pressurized fuels is disclosed in the utility model document CN201999017U. A hand truck according to that document comprises a bottom plate on which gas cylinders are placed, wheels disposed below the bottom plate, a handle provided on one side of the bottom plate, support rods provided on the other side of the bottom plate, and gas cylinder-receiving fixed rings provided on support rods. Said hand truck makes it possible to place and carry more than one cylinder on the bottom plate. However, not only the side-by-side arrangement of cylinders on the bottom plate takes up much place during transport but also the number of cylinders that can be placed on the bottom plate is limited according to that document.

Another example is disclosed in the patent document no. FR1531622A. In said document, a trolley for carrying and transporting containers, such as domestic gas cylinders, which mainly comprises a frame mounted on wheels, a stand consisting of a central tube fixed and a plurality of sleeves mounted so as to slide along this tube and each provided with support elements articulated on the sleeve and arranged to support and hold a group of containers by their base and to retain by their batches or upper parts of the receptacles of another group disposed beneath these elements is disclosed. However, since said invention uses multiple sleeves to stabilize the containers, said invention provides a cumbersome and unefficient way to transport containers.

One another example patent document AT2076956 discloses a mobile frame to carry gas bottles, in particular for use in hospitals. Said mobile frame comprises a base plate, vertical rods, brackets, and a belt to stabilize the gas bottle; wheels, hand levers and handgrips to transport and guide the said mobile frame and gas bottle on it. However, said frame is not suitable for carrying more than one gas bottle at a time.

BRIEF DESCRIPTION OF INVENTION

The present invention provides a transport means comprising at least one lower support on which at least two gas cylinders, in which gases are stored under pressure, are placed by being stacked on the top of one another; at least one body having one end connected to said lower support; at least one first steering element disposed on the body for steering the cylinders during transport, and at least two motion elements connected to said body for providing the movement of the transport means. Said transport means comprises at least one thrust mechanism allowing the topmost cylinder to move closer toward the lower support such that the cylinders stacked on the top of one another do not come apart during transport.

By virtue of the transport means developed according to the present invention, more than one cylinder can be stacked on the top of one another and carried to a target place in a balanced manner, as well as any dangerous circumstances are avoided possibly to arise when stacked cylinders come apart and fall out of the transport means during transport. The present invention further provides an ergonomic use without imposing any load on an operator using the subject transport means.

OBJECT OF INVENTION

The object of the present invention is to develop a transport means which enables to transport more than one gas cylinder at once.

Another object of the present invention is to develop a transport means which enables to stack gas cylinders to be transported on one another such that the cylinders do not take up much space.

A further object of the present invention is to develop a transport means which enables to carry cylinders in a safe and balanced manner.

Yet a further object of the present invention is to develop a transport means which does not impose load on the respective operator during use, and thus ensures an ease of use.

DESCRIPTION OF FIGURES

Illustrative embodiments of a transport means developed according to the present invention are illustrated in the accompanying figures briefly described below.

Figure 1:
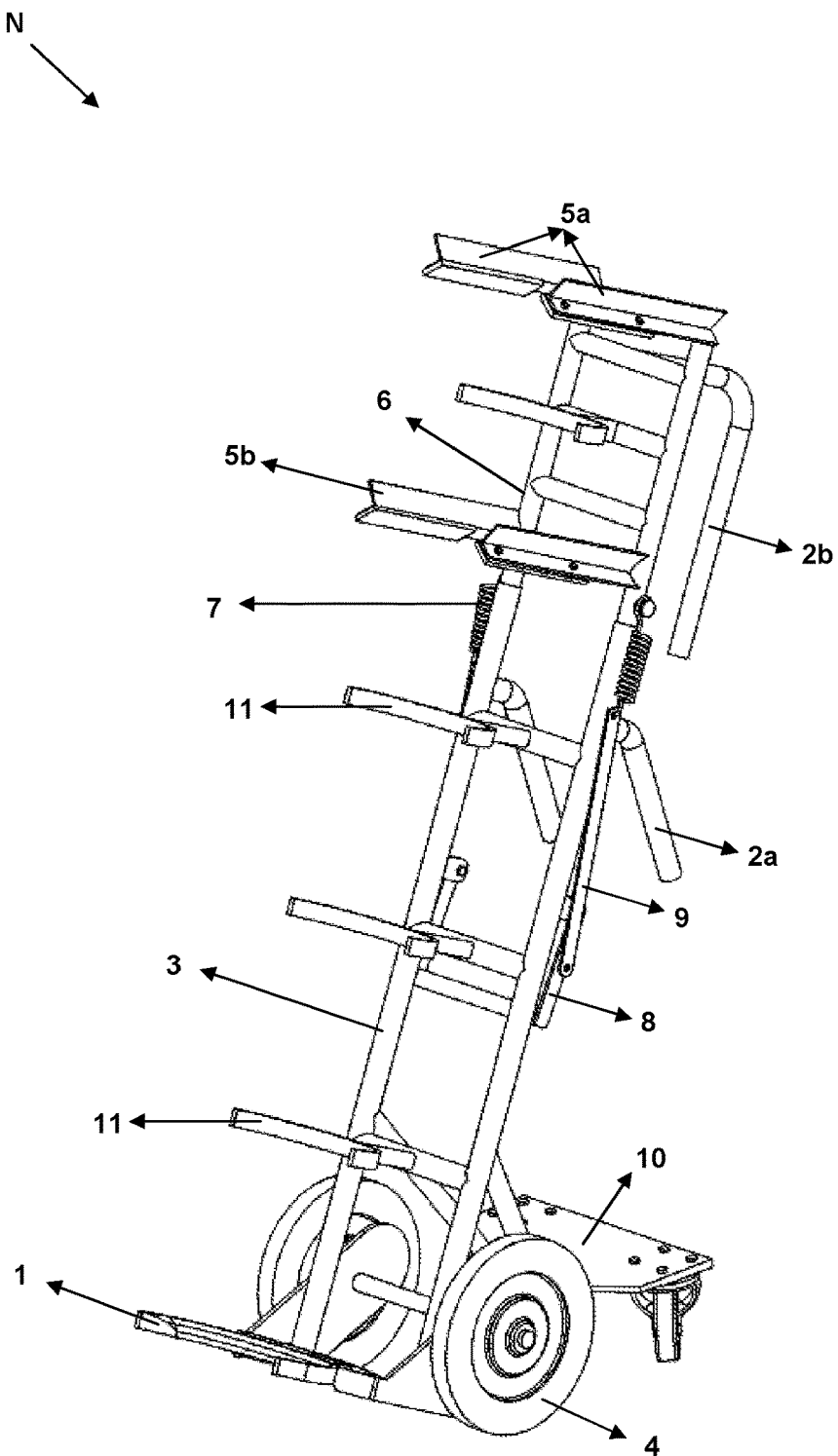
FIG. 1 is a front perspective view of a transport means developed according to the present invention.

The parts in the figures are individually designated as following.

Transport means (N)
Lower support (1)
First steering element (2*a*)
Second steering element (2*b*)
Body (3)
Motion element (4)
First thrust arm (5*a*)
Second thrust arm (5*b*)
Movable part (6)
Resilient element (7)
Drive arm (8)
Transmission element (9)
Step (10)
Support arm (11)

DESCRIPTION OF INVENTION

Cylinders, in which flammable materials such as LPG are stored, are widely used in devices such as cookers, combi boilers, gas water heaters, etc. for heating and cooking purposes. Such cylinders are heavy and difficult to transport from one place to another; therefore motorized means such as forklifts, or manual means such as hand trucks are currently used for this purpose. Additionally, when the storage of cylinders at the place where they are transported is performed by stacking them on the top of one another, can allow for saving place. Therefore, in order to be able to both transport a maximum number of cylinders at once during transport, and place the cylinders to a storage area in the form they were transported, they can be transported by being stacked on the top of one another. On the other hand, a significant force is required to displace the cylinders stacked on the top of one another, and also there is a risk that the cylinders may fall. Therefore, a transport means has been developed with the present invention, which enables to transport the gas cylinders as stacked on the top of one another, and at the same time prevents the cylinders from falling during transport.

Figure 2:
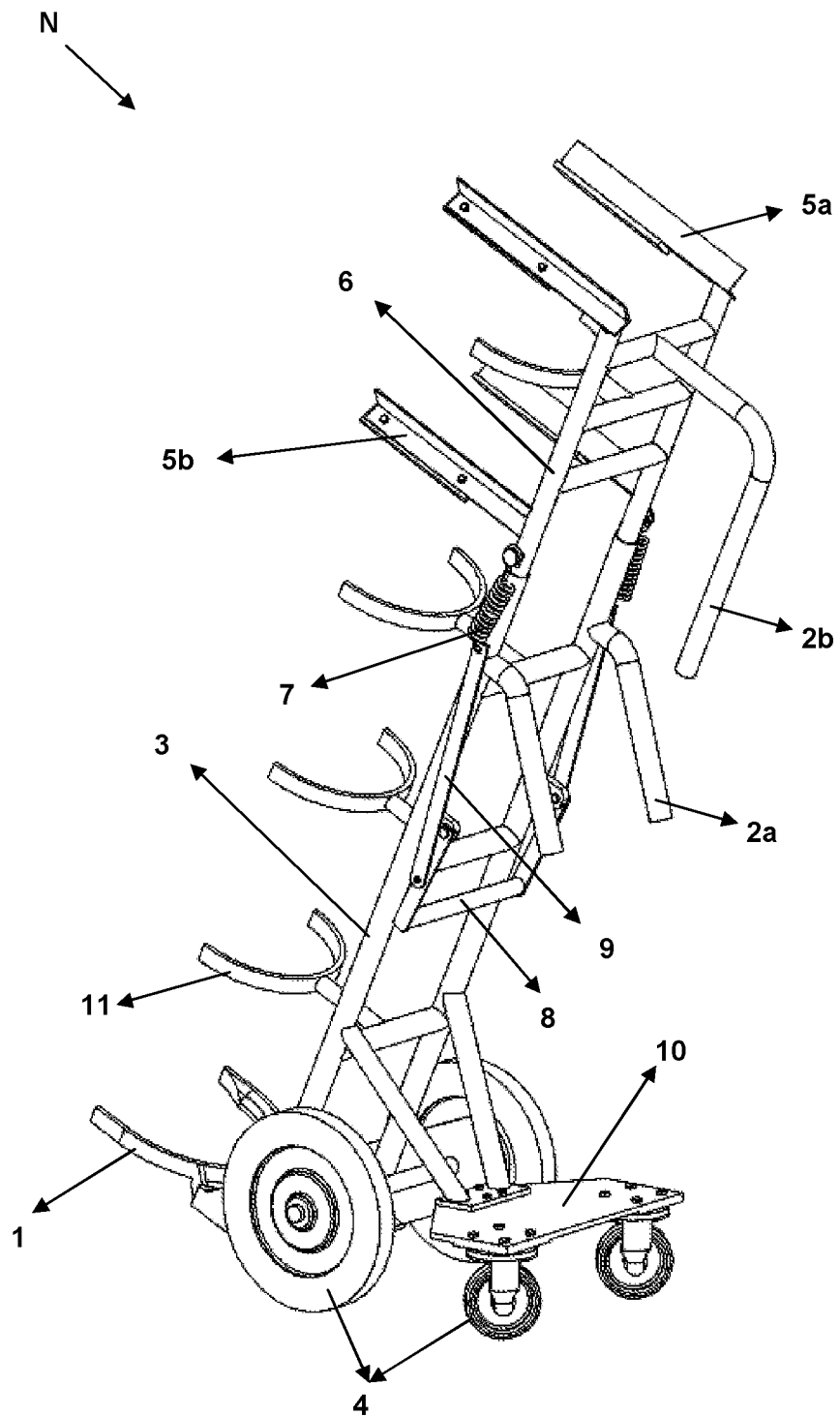
FIG. 2 is a rear perspective view of the transport means according to the present invention.
Figure 3:
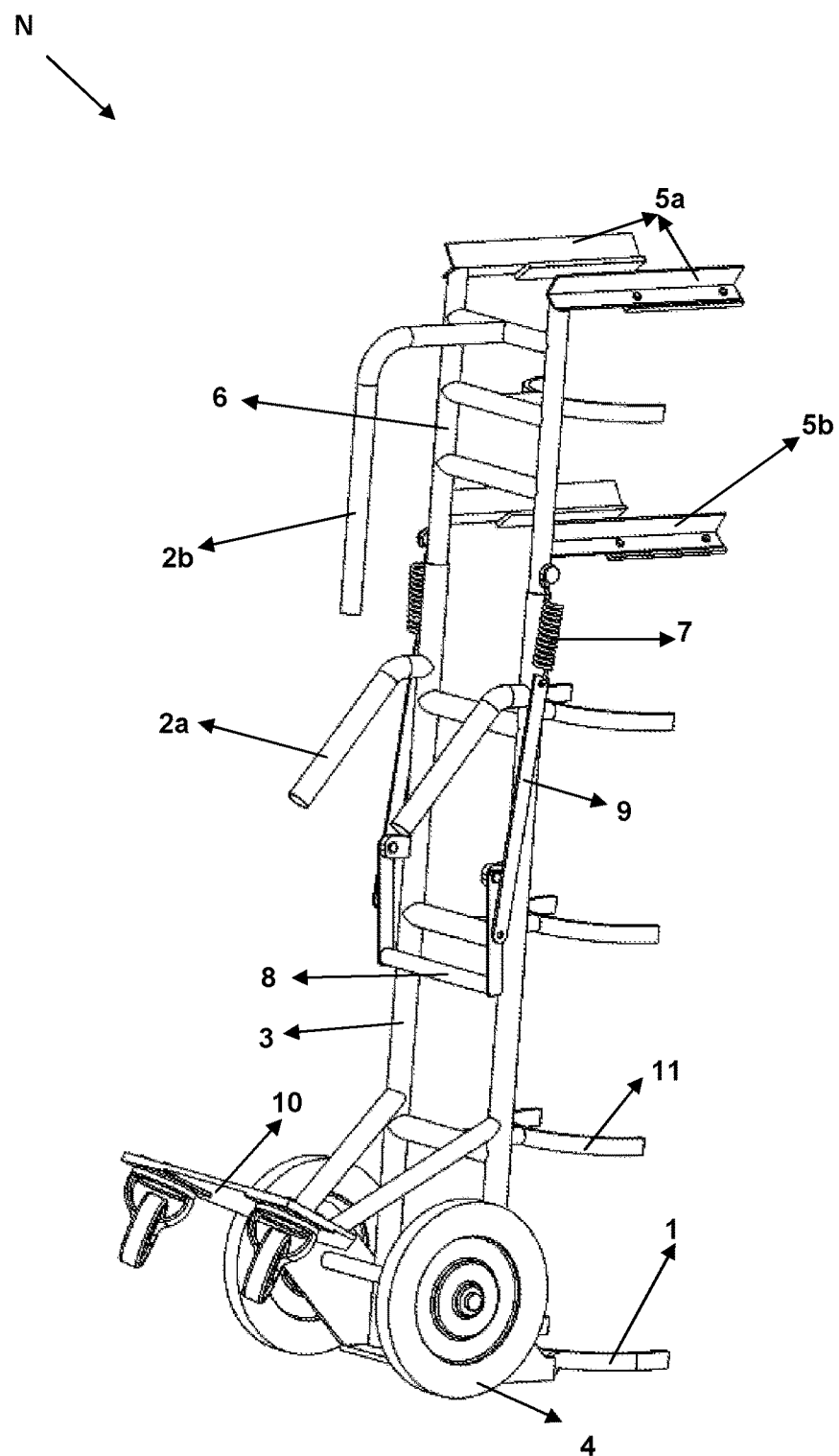
FIG. 3 is another rear perspective view of the transport means according to the present invention.

A transport means (N) developed according to the present invention, as representatively illustrated in FIGS. 1 to 3, comprises at least one lower support (1) on which at least two cylinders, in which a material possibly such as compressed gas is stored, are placed by being stacked on the top of one another: at least one body (3) having one end connected to said lower support (1); at least one first steering element (2a) disposed on the body (3) for steering the cylinders during transport, at least two motion elements (4), which may be in the form of wheels, connected to said body (3) for providing the movement of the transport means (N), and at least one thrust mechanism which allows the topmost cylinder (i.e. the cylinder that is farthest from the lower support (1)) to move closer toward the lower support (1) such that the cylinders stacked on the top of one another do not come apart during transport.

According to an exemplary embodiment of the present invention, cylinders are stacked on the top of one another and placed on the lower support (1) of the transport means (N). The lower support (1) is preferably made in a form that is suitable to receive the lowest cylinder from the pile of the cylinders (the cylinders stacked on the top of one another). In order to prevent the stacked cylinders from coming apart during transport, said thrust mechanism exerts force on the topmost cylinder in the direction of the lower support (1) so that the cylinder is forced to move closer to the lower support (1). Then, the transport means (N) is tilted angularly towards the ground, as illustrated in FIG. 1 and FIG. 2, so that the cylinders lean on the body (3). Thus, the cylinders are carried to a target place.

According to a preferred embodiment of the present invention, said thrust mechanism comprises at least one movable part (6) situated on the body (3) and capable of moving to and from the lower support (1); at least one first thrust arm (5a) disposed on the movable part (6) and exerting force on the topmost cylinder (i.e. the cylinder that is farthest from the lower support (1)) towards the lower support (1); and at least one transmission element (9) having at least one end connected to said movable part (6) (preferably from a side of the movable part (6) that is close to the lower support (1)) by means of at least one resilient member (7) which may be a spring, and at least another end connected to at least one drive arm (8) enabling a user to control the position of said first thrust arm (5a). Said drive arm (8) is connected from at least one end thereof to the body (3) preferably by means of a hinge structure, and when the user moves the drive arm (8) so as to bring it close to the lower support (1) after cylinders are placed on the transport means (N), it pushes down the transmission element (9) to which it is coupled, so that the downward movement of the transmission element (9) likewise moves the movable part (6) downwards. The first thrust arm (5a) situated on the movable part (6) comes close to the lower support (1) together with the movable part (6), and thus exerts a downward force on the cylinder it contacts, which is actually the topmost cylinder of the cylinder pile, toward the lower support (1).

A transport means (N) developed according to an alternative embodiment of the present invention comprises at least three motion elements (4) which may be in the form of wheels, in order to position the transport means in a stable manner so that an acute angle is formed between the transport means and the ground during transport of cylinders, said motion elements (4) preferably comprising at least two motion elements (4) disposed on the part close to the body (3), as well as at least one motion element (4) disposed on the part far from the body (3). According to this embodiment, the motion elements (4) are preferably arranged in a triangular configuration. When the cylinder pile is placed on the lower support (1) as the lower support (1) is parallel to the ground (e.g. as shown in FIG. 3), the user of the transport means (N) tilts the transport means so that the topmost cylinder comes closer to the user (e.g. as shown in FIGS. 1 and 2). In this state, all three motion elements (4) are in contact with the ground so that the user can move the cylinders, which are now inclined with respect to the ground, without exerting much force. According to this embodiment, the transport means (N) comprises at least one step (10) preferably situated above the motion elements (4) to facilitate the inclined positioning of the transport means (N) with respect to the ground when the cylinders are carried. After the cylinders are placed on the lower support (1), the user of the transport means (N) exerts force on said step (10) to tilt the transport means with respect to the ground so that the lowermost cylinder of the cylinder pile is away from the user. According to a preferred embodiment of the present invention, the transport means (N) comprises at least four motion elements (4), wherein at least two of said motion elements (4) situated on the front (close to the body (3)) are in the form of wheels which are not pivotable, and at least two of said motion elements disposed on the rear (far from the body (3)) are in the form of pivotable wheels (an idler wheel that can turn around itself), so that the motion elements (4) are arranged in a square configuration. By virtue of the motion elements (4) disposed at the rear and capable of turning around themselves, the transport means (N) can be steered. According to another preferred embodiment of the present invention, the size of the motion elements (4) at the front is larger than the size of the motion elements (4) at the rear. Thus, the transport means (N) is prevented from lateral tilting.

In another preferred embodiment of the transport means (N) developed according to the present invention, the transport means (N) comprises at least one second thrust arm (5b) disposed on the movable part (6) and exerting force on the cylinder, which is just below the topmost cylinder in the cylinder pile, in the direction of the lower support (1). Thus, a number of cylinders less than the maximum number of loadable cylinders can be placed on the transport means (N). According to the embodiment, the distance between the first thrust arm (5a) and the second thrust arm (5b) corresponds preferably to the height of at least one cylinder. Thus, when a maximum number of cylinders are placed to the transport means (N), both the first thrust arm (5a) and the second thrust arm (5b) exert thrust on the cylinders.

According to an alternative embodiment of the present invention, the transport means (N) comprises at least one second steering element (2b) such that the user can steer the transport means (N) more easily during transport of the cylinders. The second steering element (2b) is preferably disposed on the movable part (6), on the side of the first steering element (2a) that is far from the lower support (1).

According to a preferred embodiment, the transport means (N) comprises at least one support arm (11) which is disposed on the body (3) and/or the movable part (6) and which prevents any lateral movement of cylinders during the transport by partially surrounding the body of the cylinders in the cylinder pile.

By virtue of the transport means (N) according to the present invention, cylinders stacked on the top of one another are prevented from coming apart as they are transported from one place to another and are thus transported in a safe manner, and at the same time, the load imposed on the user of the transport means (N) during transport is reduced. Thus, a transport means (N), which is both safe and easy to use, is obtained.

The invention claimed is:

1. A transport means (N) suitable for transporting at least two cylinders in which a material which can be liquefied under pressure is stored, comprising at least one lower support (1) which is suitable for placing said two cylinders on it by being stacked on the top of one another; at least one body (3) having one end connected to said lower support (1); at least one first steering element (2a) disposed on the body (3) for steering the cylinders during transport, at least two motion elements (4) connected to said body (3) for providing the movement of the transport means (N), characterized by comprising at least one thrust mechanism, which allows the topmost cylinder to move closer toward the lower support (1) such that the cylinders stacked on the top of one another do not come apart during transport and which comprises at least one movable part (6) situated on the body (3) and capable of moving so as to come close to and move away from the lower support (1); at least one first thrust arm (5a) disposed on the movable part (6) and exerting force on the topmost cylinder towards the lower support (1); and at least one transmission element (9) having at least one end connected to said movable part (6) by means of at least one resilient member (7) and at least another end connected to at least one drive arm (8) enabling a user to control the position of said first thrust arm (5a),
  characterized by comprising at least three motion elements (4)
    characterized by comprising at least one step (10) to facilitate the inclined positioning of the transport means (N) with respect to the ground when cylinders are transported,
    characterized in that the step (10) is situated above the motion elements (4).

2. The transport means (N) according to claim 1, characterized in that the lower support (1) has such a structure which is suitable to receive the lowermost cylinder of the cylinders stacked on the top of one another.

3. The transport means (N) according to claim 1, characterized in that the resilient member (7) is a spring.

4. The transport means (N) according to claim 1, characterized in that said transmission element (9) is connected to the movable part (6) from a side of the movable part (6) that is close to the lower support (1).

5. The transport means (N) according to claim 1, characterized in that the drive arm (8) is connected, from at least one end thereof, to the body (3).

6. The transport means (N) according to claim 5, characterized in that the drive arm (8) is connected to the body (3) by means of a hinge structure.

7. The transport means (N) according to claim 1, characterized by comprising at least three motion elements (4).

8. The transport means (N) according to claim 1, characterized in that the motion elements (4) are wheels.

9. The transport means (N) according to claim 7, characterized in that at least two of the motion elements (4) are situated on the part close to the body (3) and at least one of the motion elements is situated on the part far from the body (3).

10. The transport means (N) according to claim 7, characterized by comprising at least one step (10) to facilitate the inclined positioning of the transport means (N) with respect to the ground when cylinders are transported.

11. The transport means (N) according to claim 7, characterized in that at least two of the motion elements (4) situated close to the body (3) are in the form of wheels which are not pivotable, and at least one of said motion elements situated far from the body (3) is in the form of a pivotable wheel.

12. The transport means (N) according to claim 1, characterized by comprising at least four motion elements of which at least two situated close to the body (3) are not pivotable, and of which at least two situated far from the body (3) are pivotable.

13. The transport means (N) according to claim 7, characterized in that the size of at least one motion element (4) at the front is larger than the size of at least one motion element (4) at the rear.

14. A transport means (N) suitable for transporting at least two cylinders in which a material which can be liquefied under pressure is stored, comprising at least one lower support (1) which is suitable for placing said two cylinders on it by being stacked on the top of one another; at least one body (3) having one end connected to said lower support (1); at least one first steering element (2a) disposed on the body (3) for steering the cylinders during transport, at least two motion elements (4) connected to said body (3) for providing the movement of the transport means (N), characterized by comprising at least one thrust mechanism, which allows the topmost cylinder to move closer toward the lower support (1) such that the cylinders stacked on the top of one another do not come apart during transport and which comprises at least one movable part (6) situated on the body (3) and capable of moving so as to come close to and move away from the lower support (1); at least one first thrust arm (5a) disposed on the movable part (6) and exerting force on the topmost cylinder towards the lower support (1); and at least one transmission element (9) having at least one end connected to said movable part (6) by means of at least one resilient member (7) and at least another end connected to at least one drive arm (8) enabling a user to control the position of said first thrust arm (5a),
  characterized by comprising at least one second thrust arm (5b) disposed on the movable part (6) and exerting force on that cylinder which is just below the topmost one in the cylinder pile in the direction of the lower support (1).

15. The transport means (N) according to claim 14, characterized in that the distance between the first thrust arm (5a) and the second thrust arm (5b) corresponds to the height of at least one cylinder.

16. A transport means (N) suitable for transporting at least two cylinders in which a material which can be liquefied under pressure is stored, comprising at least one lower support (1) which is suitable for placing said two cylinders on it by being stacked on the top of one another; at least one body (3) having one end connected to said lower support (1); at least one first steering element (2a) disposed on the body (3) for steering the cylinders during transport, at least two motion elements (4) connected to said body (3) for providing the movement of the transport means (N), characterized by comprising at least one thrust mechanism, which allows the topmost cylinder to move closer toward the lower support (1) such that the cylinders stacked on the top of one another do not come apart during transport and which comprises at least one movable part (6) situated on the body (3) and capable of moving so as to come close to and move away from the lower support (1); at least one first thrust arm (5a) disposed on the movable part (6) and exerting force on the topmost cylinder towards the lower support (1); and at least one transmission element (9) having at least one end connected to said movable part (6) by means of at least one resilient member (7) and at least another end connected to at least one drive arm (8) enabling a user to control the position of said first thrust arm (5a)

characterized by comprising at least one second steering element (2b) such that the user can steer the transport means (N) more comfortably during transport of cylinders characterized in that the second steering element (2b) is disposed on the movable part (6), on the side of the first steering element (2a) that is far from the lower support (1).

17. The transport means (N) according to claim 1, characterized by comprising at least one support arm (11) which is disposed on the body (3) and/or the movable part (6) and prevents any lateral movement of the cylinders during the transport by partly surrounding the body of the cylinders in the cylinder pile.

18. The transport means (N) according to claim 14, characterized in that the lower support (1) has such a structure which is suitable to receive the lowermost cylinder of the cylinders stacked on the top of one another.

19. The transport means (N) according to claim 14, characterized in that the resilient member (7) is a spring.

20. The transport means (N) according to claim 14, characterized in that said transmission element (9) is connected to the movable part (6) from a side of the movable part (6) that is close to the lower support (1).

* * * * *